May 14, 1946. J. VAN B. DUER 2,400,400
TOWING SYSTEM FOR AIRCRAFT
Filed Dec. 14, 1942 5 Sheets-Sheet 4
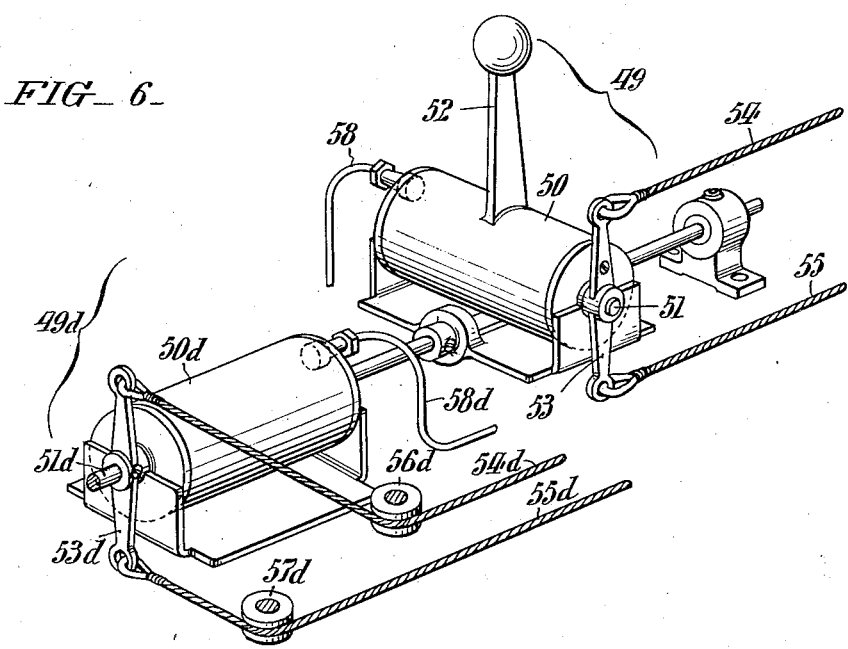
FIG_6_
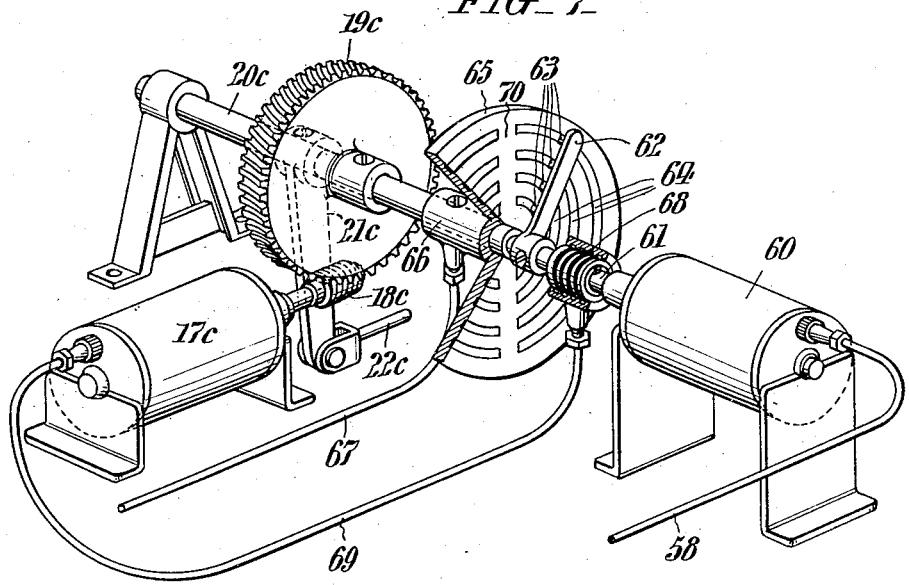
FIG_7_
WITNESSES:
Hubert Fuchs
Thomas W. Kerr, Jr.
INVENTOR:
John Van Buren Duer,
BY Paul & Paul
ATTORNEYS.

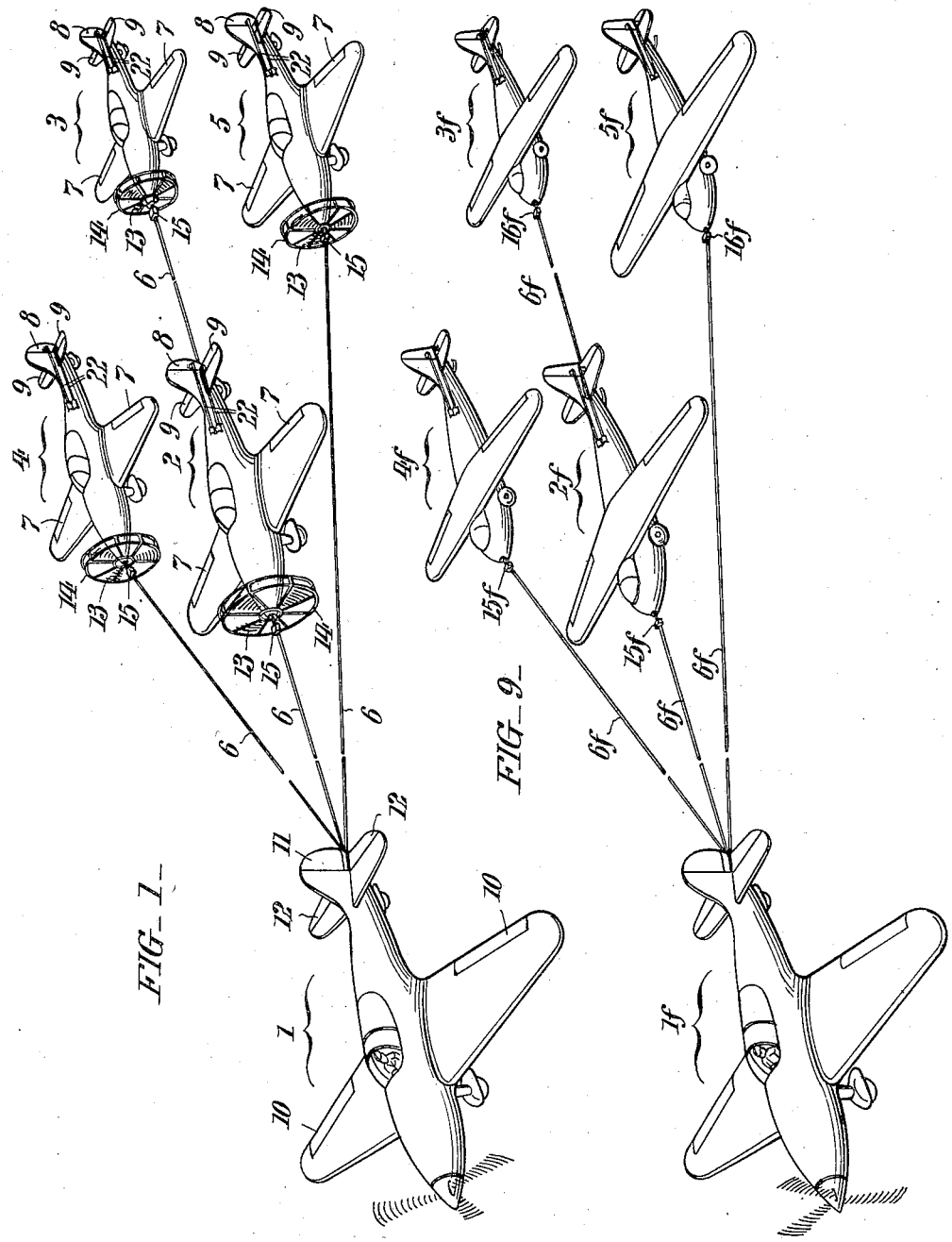

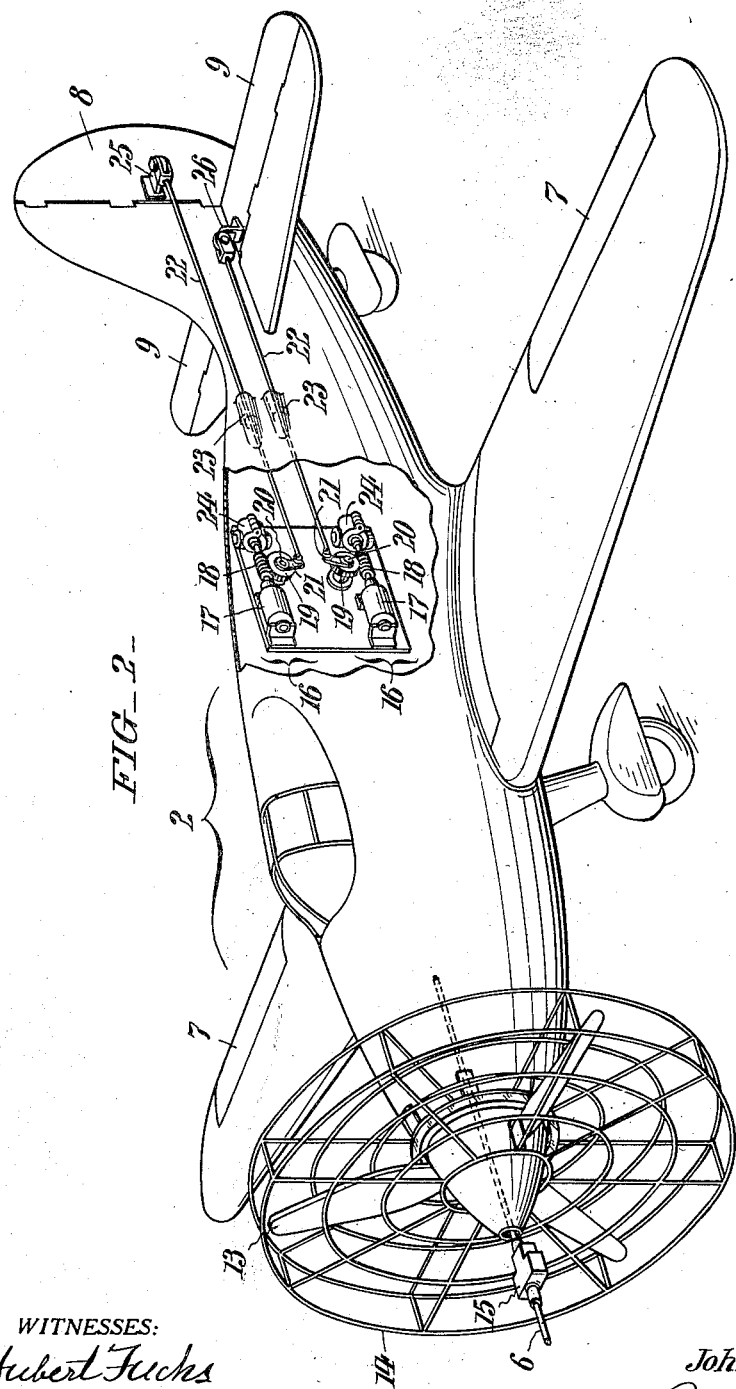

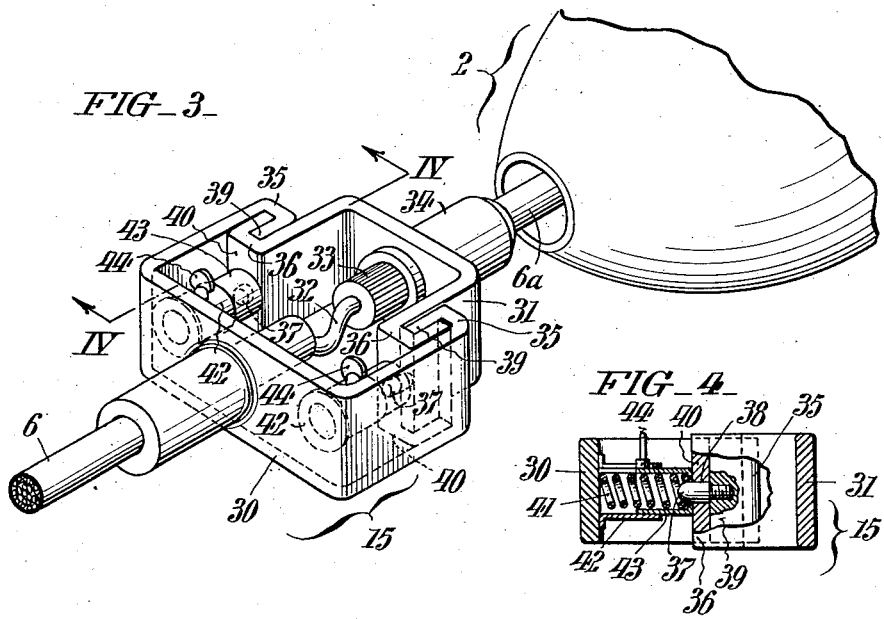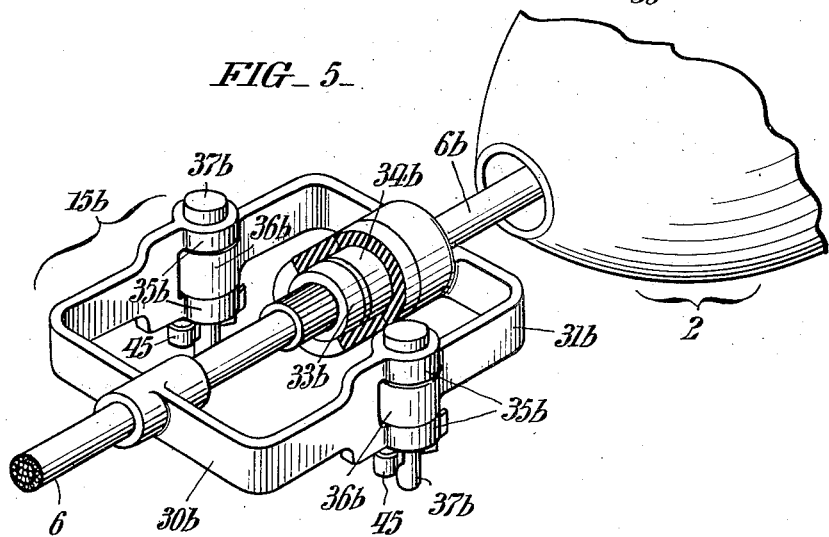

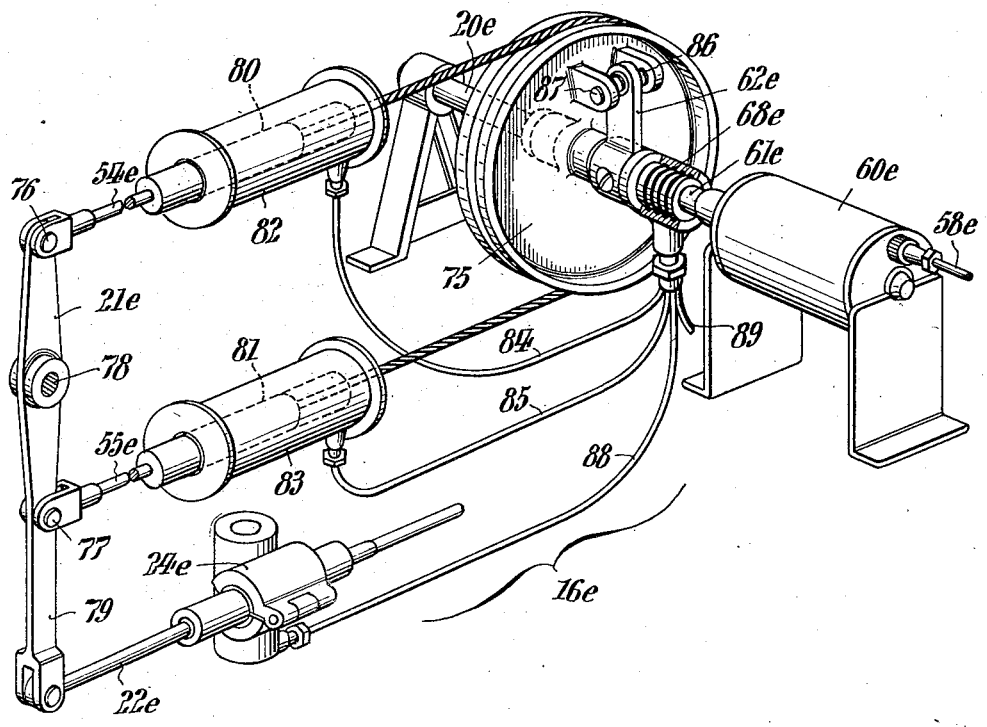

UNITED STATES PATENT OFFICE 2,400,400

TOWING SYSTEM FOR AIRCRAFT

John Van Buren Duer, Narberth, Pa., assignor to The Pennsylvania Railroad Company, Philadelphia, Pa., a corporation of Pennsylvania Application December 14, 1942, Serial No. 468,880

8 Claims. (Cl. 244—3)

This invention relates to towing systems for aircraft, particularly for craft of the heavier than air type, including both motor-driven and motorless planes or gliders.

My invention has for its chief aim to enable the towing at one time by a single master or towing plane, of a plurality of other planes without necessitating the presence of pilots in the towed craft.

It is a further aim of my invention to insure against displacement of the flight-governing elements of the towed craft from the positions to which said elements are moved at each actuation under the control of the pilot of the master or towing craft.

These things I realize in practice as hereinafter more fully disclosed by providing the towing craft with a plurality of flexible, rearwardly-extending, tow lines having detachable couplings for connection of the craft to be towed, said lines having incorporated in them, means through which actuating mechanisms for the flight-governing elements of the towed craft are simultaneously and synchronously operated with the corresponding elements of the towing plane by the pilot of the latter during flight, and through the further provision of means associated with the said actuating mechanisms for preventing displacement of the flight governing elements of the towed craft from the positions to which they are moved at each actuation.

Other objects and attendant advantages will appear from the following detailed description of the attached drawings, wherein Fig. 1 is a perspective view showing the manner of towing a group of individually powered airplanes according to my invention.

Fig. 2 is a larger scale perspective view of one of the towed planes in Fig. 1 showing more or less diagrammatically one form of mechanism whereby the flight governing elements of the towed plane are operated from the towing plane.

Fig. 3 is a perspective view of one form of detachable coupling device for connecting the towed planes to the tow line extending from the towing plane.

Fig. 4 is a perspective view of one of the components of the coupling device of Fig. 3.

Fig. 5 is a view corresponding to Fig. 3 of an alternative form of coupling device.

Figs. 6 and 7 are perspective views of alternative control and responsive controlled mechanisms respectively for the towing and towed planes.

Fig. 8 is a view similar to Fig. 7 showing a modified form of controlled unit for the towed planes; and Fig. 9 is a view like Fig. 1 showing the manner of towing motorless planes or gliders in accordance with my invention.

In Fig. 1 the master or towing plane is indicated at 1 and the towed planes, whereof four are illustrated for the purpose of exemplification herein, are designated by the numerals 2, 3, 4 and 5. The trailing planes 2, 4 and 5 are shown as arranged in parallel with the towing plane, while the plane 3 is in series with the plane 2. This arrangement of the towed planes is of course to be considered as typical of others which can readily be made in practice if desired or found convenient. The direct connections between the towing plane 1 and the towed planes 2, 4 and 5 are in the form of flexible cables 6 made up of, or having incorporated in them, a plurality of wire conductors for carrying electric current from suitable hereinafter-described controls in the towing plane 1 to actuating mechanism within the towed planes for moving the ailerons 7, rudders 8, the elevators 9 and the engine throttles (not shown) of said towed planes in positions corresponding with the setting of the corresponding elements 10, 11 and 12 of the towing plane 1 by the pilot in the latter during flight. As shown, the propellers 13 of the towed planes are enclosed in guards 14, of wire or the like, for assurance against being fouled by the cables 6 in the event that said cables should become slack. Through suitable coupling devices indicated at 15 and also later on described in detail, the towed planes 2—5, after being delivered at the desired destination, can be detached from the respective cables 6 by which they are connected to the towing plane.

In Fig. 2, which is an enlarged perspective view of one of the towed planes, I have shown, by way of example, duplicate actuating units 16 for respectively moving the rudder 8, and one of the elevators 9. Each such actuating unit 16 includes a reversible electric motor 17 with a worm 18 on its shaft in mesh with worm wheel 19 on a countershaft 20, an arm 21 secured to said shaft being connected to a rod 22 which extends rearwardly through a guide bearing 23 in the side of the plane body. Each actuating unit 16 also includes a magnetic brake 24 which serves to normally hold the worm shaft against rotation, but which is automatically released during the operating periods of the motor 17. As further shown in Fig. 2, the outer ends of the rods 22 of the two actuating units 16 are respectively connected to arms 25 and 26 on the rudder 8 and to the elevator 9 at that side of the plane nearest the observer. Other actuating units (not illustrated) like the units 16, are of course provided in practice for actuating the elevator 9 at the opposite side of the plane and the ailerons 7, as well as the engine throttle of the towed plane. In each instance, the motor 17 is instantly stopped, upon interruption of current flow thereto, by the magnetic brake 24 so that the controlled element, i. e., the rudder, elevator, aileron or engine throttle, is restrained against displacement in shifted positions, with the plane held to a definite course and a definite speed. As hereinbefore implied, the current for running the motors 17 as well as the motors of similar mechanism 16 for actuating the ailerons and the engine throttle of the towed plane, is conducted from a suitable source, such as a generator (not illustrated) in the towing plane 1 through wires incorporated in the cable 6. The control equipment in the towing plane 1 may be in the form of suitable manually-operable reversing switches (not illustrated) for the individual motors 17 of the several actuating units 16 in the towed plane.

The coupling device 15, detailed in Figs. 3 and 4, comprises a pair of oppositely-arranged U-shaped components 30 and 31, whereof the component 30 is rigidly secured to the end of the main segment of the cable 6 which section extends from the towing plane 1, while the component 31 is secured to a short cable segment 6a extending out of the nose of the towed plane 2 at the axis of the propeller of said plane. The current-carrying wires of the main cable segment 6 extend beyond the rear end of said segment as at 32 into a multi-prong plug 33 which is removably engaged in a terminal socket 34 carried by the coupling component 31. As further shown in Fig. 3, the end portions of the components 30, 31 are retroverted as at 35 and 36 respectively for interlocking engagement. Relative lateral displacement of the coupling components when interlocked is prevented by pins 37 on the inturned ends 39 of the component 30 with apertures 38 in the bends 40 of the component 31, the registry between said pins and said apertures being maintained by means of springs 41, see Fig. 4, which are coaxial with the pins. As shown the springs 41 are enclosed within individual sheathing elements 42 whereof the sliding end portions 43 are retractible by means of finger grasps 44 on them to compress the springs when the coupling components 30, 31 are to be detached from each other.

Fig. 5 shows an alternative form of coupling member 15b in which the ends of the component 30b terminate in bosses 35b which are bifurcated to respectively receive eyes 36b at the ends of the component 31b. Headed bolts 37b, with their shanks passing through aligned apertures in the bosses 35b and the eyes 36b, are here relied upon to hold the two components 30b and 31b assembled. To insure against accidental dislodgment of the bolts 37b, cotter pins 45 are secured in crosswise openings in the protruding lower ends of bolt shanks. As in the form shown in Fig. 3, a plug 33b and a socket 34b are here provided for detachably connecting the current-conducting wires of the main cable segment 6 with the wires in a shorter cable segment 6b on the towed plane 2. Uncoupling is effected in this instance by first removing the cotter pins and then withdrawing the bolts 37b.

The alternative form of control mechanism illustrated in Figs. 6 and 7 involves what is generally known as "Selsyn" equipment by aid of which the movements imparted manually to the flight governing elements of the master or towing plane by the pilot are automatically and synchronously communicated in exactly the same degree to the corresponding flight-governing elements of the towed plane or planes. As shown in Fig. 6, this organization includes a unit 49 with a Selsyn generator 50 which is free on a fixed shaft 51 and which is rockable about said shaft by means of the attached control stick 52 of the main or towing plane. Also free on the shaft 51 but secured to the Selsyn generator 50 is a double-armed lever 53 to the extremities of which are attached the ends of cables 54, 55 which extend to the elevator or elevators 9 (Fig. 1) of the main or towing plane. Through this arrangement, the movements of the control stick 52 are translated into corresponding movements of the elevators 9 as ordinarily. However, by attendant action of the Selsyn generator 50, which, through a conductor cord 58, is electrically connected with a Selsyn motor 60 (Fig. 7) in the towed plane, the shaft of said motor is turned by exactly the same amount at each operation as said generator is rotatively shifted by manipulation of the stick 52. Affixed on the shaft 61 of the Selsyn motor 60 is a wiper arm 62 with contacts 63 thereon which correspond to metallic commutator segments 64 on a disk 65 of insulation. As shown, the disk 65 is affixed to a shaft 20c which is aligned with, but independent of, the shaft 61 of the Selsyn motor 60. The power input to the disk 65 is indicated at 66, current being supplied through a conductor cord 67 to said input. The power take-off from the disk 65 by way of the contact arm 62 is indicated at 68 and shown as being in the form of a distributor whereof certain of the rings are in circuit with a conventional electric motor 17c through a conductor cord 69. The contacts on the disk are arranged so that the actuating motor operates clockwise when the wiper arm is on one side of the blank radial space 70 of disk 65, and counter-clockwise when the wiper arm is on the opposite side of said blank space of the disc. As in the embodiment of my invention illustrated in Fig. 2, the conventional motor 17c here has a worm 18c on its shaft in mesh with a worm wheel 19c on the shaft 20c. Also mounted in fixed relation on the shaft 20c is an arm 21c, which, by means of a rod 22c, is coupled with an elevator of the towed plane. Thus, in the arrangement of Fig. 7, as the arm 62 is moved rightward, for example, under the influence of the Selsyn motor 60 to the position shown, current immediately flows by way of the cord 69 to the conventional motor 17c, which, through the worm 18c, wheel 19c and shaft 20c, causes clockwise rotation of the disk 65. This movement will continue until the blank radial space 70 of the disk 65 coincides with the contact arm 62, whereupon current flow to the conventional motor 17c will immediately cease, with the elevator or elevators of the towed plane set in exactly the same position as the corresponding elevator or elevators of the main or towing plane. Except as presently explained, the unit comprehensively designated 49d in Fig. 6 is generally similar to the unit 49 and the component elements thereof having their counterparts in said unit 49 have therefore, in order to prevent the necessity of repetitive description, been identified with the same reference numerals to each of which the letter d has been added for convenience of more ready distinction. Here, however, the Selsyn generator 50d and the double arm lever 53d which latter is connected by means of cables 54d and 55d running about guide pulleys 56d and 57d to the rudder 8 of one of the towing planes, are both secured to the shaft 51. To this shaft 51 is also rigidly secured the base of the Selsyn generator 50 of the unit 49, so that the rudder 11 (Fig. 1) of the towing plane can be operated by lateral movement of the pilot's control stick 52. It is to be assumed that the conductor cable shown at 58d in Fig. 6 extends to other units like the one of Fig. 7 in a towed plane, whereof the lever 21c is connected by a cable or rod to the rudder 8 (Fig. 1) of said towed plane. It therefore follows that the shifts imparted to the rudder of the towing plane through lateral movements of the control stick 52 are simulated in direction and degree in the rudder of the towed plane. Other coordinated units like those of Figs. 6 and 7 are provided in practice through which the ailerons, engine throttles, etc., of the towed plane or planes are similarly operated automatically in synchronism with the movements imparted to the corresponding elements of the towing plane under the control of the pilot in the latter. While I have described operation of the flight controlling elements of the towed planes synchronously with those of the towing plane, they may of course be independently operated as previously pointed out herein.

In Fig. 8 I have shown modified mechanism 16e for actuating individual flight governing elements of the towed planes. Here, as in the form shown in Fig. 7, a Selsyn motor 60e connected by a conductor cord 58e with the Selsyn generator in the main or towing plane, is utilized as a means to operate a switch arm 62e affixed to the shaft 61e of said motor. Here also an independently movable shaft 20e is axially aligned with the shaft 61e of the motor 60e. Freely mounted on the shaft 20e but held against axial displacement thereon, is a sheave 75 about which passes a cable whereof the opposite ends 54e and 55e are connected at 76 and 77 to a lever 21e at points above and below the fulcrum 78 of the latter. As shown, the lower arm of the lever 21e is prolonged below the point 77 as at 79, and to such prolongation is pivotally connected a rod 22e which extends rearward to a flight governing element of the towed plane in the same manner as the rods 22 in Fig. 2. Affixed to the cable ends 54e, 55e are the armatures 80 and 81 of oppositely acting solenoids 82, 83 respectively, whereof the coils are in circuit through conductor cords 84, 85 with individual rings of a distributor 68e on the shaft 61e of the Selsyn motor 60e. Other rings of the distributor 61e are in circuit with spring contacts 86 and 87 on the sheave 75 between which contacts the arm 62e extends. Thus, when the shaft 61e moves clockwise for example, the arm 62e closes the switch 86 as a consequence of which current will flow to the solenoid 82 with attendant rightward pull on the end 54e of the cable and impartation, through the lever 21e, of a leftward pull on the rod 22e. In a similar manner, anti-clockwise movement of the shaft 61e of the Selsyn motor 60e will result in closing of the switch 87 with attendant energization of the solenoid 83 and rightward pull on the end 55e of the cable whereby the rod 22e is in turn shifted rightward. The magnetic brake shown at 24e serves to hold the rod 22e against displacement in shifted positions, said brake being controlled through a conductor cord 88 from still other rings of the distributor 68e.

Current for operating the unit 16e is supplied by way of the conductor cord indicated at 89.

As shown in Fig. 9, my invention can also be utilized to tow a group of motorless planes or gliders 2f—5f which, through cables 6f, are connected to a master or towing plane 1f in exactly the same manner as in Fig. 1, control units like the units 49 and 49d of Fig. 6 being provided in the towing plane, and responsive units like those shown in Fig. 7 or 8 provided for actuating the rudders, elevators and ailerons of said gliders.

Having thus described my invention, I claim:

1. In an aerial towing system, a towing craft having an elevator and a rudder, and control means for said elevator and rudder; a tow line connecting a towed craft to the towing craft, said towed craft likewise having an elevator and a rudder and being provided with elevator and rudder-actuating means; and operating connections embodied in the tow line and extending between the elevator and rudder control means of the towing craft and the elevator and rudder actuating means of the towed craft and operated by movement of the control means.

2. The invention according to claim 1, further including a separable coupling means by which the towed craft is releasably connected to the tow line.

3. In an aerial towing system, a towing craft having an elevator and a rudder, and a control element mounted for selective movement in directions at an angle to each other, interposed instrumentalities whereby said elevator and rudder are respectively shifted through such movements of the control element; a tow line connecting a towed craft to the towing craft, said towed craft being likewise provided with an elevator and a rudder; and means embodied in the tow line and operated by movement of the control element of the towing craft for shifting the elevator and the rudder of the towed craft in correspondence with the shifts of the elevator and the rudder of said towing craft.

4. In an aerial towing system, a towing craft having an elevator and a rudder, control means including a pair of shafts with interposed connections respectively to said elevator and rudder, and a Selsyn generator actuated from each of said shafts; a tow line connecting to the towing craft, a towed craft likewise having an elevator and a rudder and provided with elevator and rudder-actuating means including Selsyn motors; and electrical connections embodied in the tow line and extending between the Selsyn generators in the towing craft to the Selsyn motors in the towed craft.

5. The invention according to claim 4, further including a separable coupling means by which the towed craft is releasably connected to the tow line.

6. In an aerial towing system, a towing craft having a control element supported for selective movement on shafts at an angle to each other, and interposed instrumentalities operatively connecting said elevator and said rudder to the respective shafts; a tow line connecting to the towing craft, a towed craft similarly provided with an elevator and a rudder; Selsyn motors for respectively actuating the elevator and rudder of the towed craft; Selsyn generators respectively operated from the two shafts of the control means in the towing craft; and electrical connections embodied in the tow line and extending from the Selsyn generators in the towing craft to the elevator and rudder-actuating Selsyn motors in the towed craft.

7. The invention according to claim 3, in which the elevator and rudder-actuating means on the towed craft further includes contact arms respectively affixed to the shafts of the Selsyn motors and bearing on segment disks affixed to aligned supplemental shafts, reversible conventional motors respectively adapted to be supplied with current through the segment disks, gearing between said conventional motors and the respective supplemental shafts, and mechanical connections respectively between said supplemental shafts and the elevator and rudder of the towed craft.

8. The invention according to claim 3, in which the elevator and rudder-actuating means on the towed craft includes contact arms respectively secured to the shafts of the Selsyn motors and extending between spaced contact and drive lugs projecting from drums freely mounted on supplemental shafts respectively aligned with the shafts of the Selsyn motors, medially fulcrumed levers having their opposite ends connected to the ends of cables respectively extending around the drums and also mechanically connected respectively to said elevator and rudder, and pairs of reversely-operated solenoids with stationary coils adapted to respectively receive current through the contacts aforesaid depending upon the direction of the corresponding Selsyn motors, and with armatures secured to the opposite ends of the corresponding drum cables.

JOHN VAN BUREN DUER.